United States Patent [19]
Bonk et al.

[11] 3,899,467
[45] Aug. 12, 1975

[54] POLYURETHANES FROM 3,3'-DIMETHYL-DIPHENYL-4,4'-DIISOCYANATE POLYESTER DIOLS AND BIS(HYDROXYETHYL ETHER) OF HYDROQUINONE

[75] Inventors: Henry W. Bonk, Wallingford; Tilak M. Shah, North Haven, both of Conn.

[73] Assignee: The Upjohn Company, Kalamazoo, Mich.

[22] Filed: May 14, 1974

[21] Appl. No.: 469,656

[52] U.S. Cl.. 260/47 CB; 260/75 NP; 260/77.5 AN
[51] Int. Cl............................................. C08g 22/26
[58] Field of Search .... 260/47 CB, 77.5 AN, 75 NP

[56] References Cited
UNITED STATES PATENTS

| | | | |
|---|---|---|---|
| 3,658,756 | 4/1972 | Reuter | 260/47 |
| 3,663,515 | 5/1972 | Hostettler et al. | 260/77.5 |
| 3,711,440 | 1/1973 | Chudwick | 260/47 |
| 3,741,918 | 6/1973 | Koleske et al. | 260/2.5 |

*Primary Examiner*—Lester L. Lee
*Attorney, Agent, or Firm*—Denis A. Firth; John Kekich

[57] ABSTRACT

Polyurethane elastomers characterized by high thermostability and thermoplasticity are obtained by reaction of 3,3'-dimethyldiphenyl-4,4'-diisocyanate with a polyester diol (polycaprolactone diol preferred) and the bis(2-hydroxyethyl ether) of hydroquinone. The elastomers are useful in gasketing, seals, o-rings, wire coatings and like applications in which service temperatures of 120°C or even higher are a requisite.

6 Claims, No Drawings

POLYURETHANES FROM 3,3' DIMETHYL DIPHENYL 4,4'-DIISOCYANATE POLYESTER DIOLS AND BIS(HYDROXYETHYL)ETHER OF HYDROQUINONE

BACKGROUND OF THE INVENTION

1. Field of the Invention

This invention relates to polyurethane elastomers and methods for their preparation and is more particularly directed to certain polyurethane elastomers derived from 3,3'-dimethyldiphenyl-4,4'-diisocyanate and with processes for their preparation.

2. Description of the Prior Art

Polyurethane elastomers derived from 3,3'-dimethyldiphenyl-4,4'-diisocyanate are well-recognized in the art and the increased resistance to degradation by heat possessed by such elastomers compared with similar elastomers derived from other diisocyanates is also recognized; see, for example, Rausch et al., Industrial and Engineering Chemistry, Product Research and Development, 6, 1967, p. 12.

We have now found that elastomers derived from 3,3'-dimethyldiphenyl-4,4'-diisocyanate and a particular combination of polyol and extender possess outstanding resistance to exposure to high temperature and that this result is achieved without sacrificing other desirable properties in the product.

SUMMARY OF THE INVENTION

This invention comprises a high temperature resistant, thermoplastic polyurethane elastomer characterized by the presence therein of each of the recurring units of the following formulae:

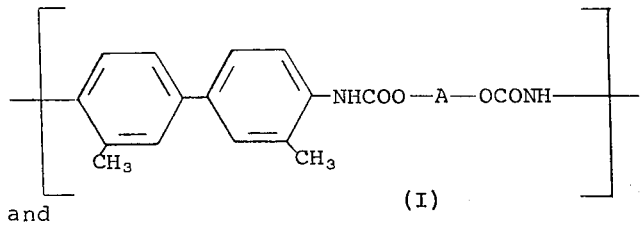

and

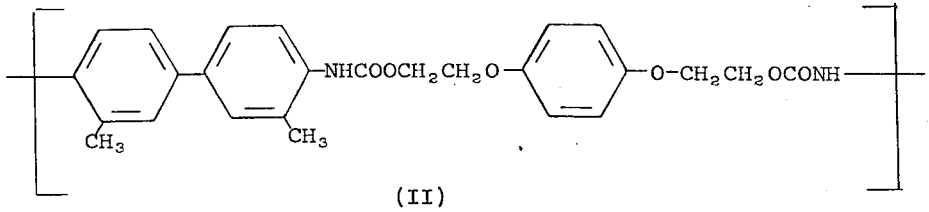

wherein A is the residue of a polyester diol HO—A—OH having a molecular weight in the range of 800 to 3500, the overall proportion of units having the formula (I) to units having the formula (II) in said polyurethane elastomer being within the range of 1:1 to 1:7.

The invention also comprises processes for the preparation of the elastomers defined above.

The polyurethanes of the invention are useful for all purposes for which elastomeric polyurethanes are conventionally employed but are particularly useful in situations in which elastomer is to be exposed to temperatures up to about 120°C or even higher over prolonged periods. Illustrative of such situations are automobile and like gasketry, o-rings, seals of other types, wire coatings and the like.

DETAILED DESCRIPTION OF THE INVENTION

The polyurethane elastomers of the invention can be prepared by processes conventional in the art for the synthesis of polyurethane elastomers. Such processes include the one-shot procedure in which all the reactants are brought together simultaneously, and the prepolymer procedure in which the isocyanate is reacted with the polyester diol in a preliminary step and the isocyanate-terminated prepolymer so produced is subsequently reacted with the extender which, in this case, is the bis(2-hydroxyethyl ether) of hydroquinone. The one-shot procedure is the preferred method of preparing the elastomeric polyurethanes of the invention. In a most preferred embodiment of the one-shot procedure the polyurethane elastomers of the invention are prepared by a continuous procedure such as that set forth in U.S. Pat. No. 3,642,924.

The polyester diols employed in preparing the polyurethane elastomers of the invention are essentially linear polyester diols having a molecular weight within the range of 800 to 3500. Illustrative of such polyester diols are those obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are, in fact, the polyester diols preferred for use in the preparation of the instant polyurethanes. These diols are prepared by polymerizing the appropriate caprolactone with the appropriate difunctional initiator such as an aliphatic glycol as exemplified above or an alkanolamine, such as ethanolamine, propanolamine, butanolamine, and the like. Such procedures and products are well-known in the art; see, for example, U.S. Pat. No. 2,914,556. A particularly preferred polyester diol is that obtained by initiating the polymerization of ε-caprolactone with 1,4-butanediol.

The proportion of equivalents of hydroquinone bis(2-hydroxyethyl ether) to equivalents of polyester diol (or mixture of two or more polyester diols if such is used) employed in making the compositions of the invention is advantageously within the range of about 1:1 to about 7:1 and preferably within the range of about 1.5:1 to about 5:1.

The proportion of equivalents of 3,3'-dimethyldiphenyl-4,4'-diisocyanate to the total equivalents of hydroquinone bis(2-hydroxyethyl ether) and polyester diol (or mixture of two or more such diols) is advantageously within the range of 0.98:1 to 1.10:1 and preferably within the range of 1.02:1 to 1.05:1.

As set forth above, the polyurethane elastomers of the invention are preferably made by the one-shot procedure and most preferably by a continuous one-shot procedure. In such procedures the reactants are brought together in any order. Advantageously, the polyols, i.e. the polyester diol and the hydroquinone bis(2-hydroxyethyl ether) are preblended and fed to the reaction mixture as a single component, the other major component being the diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25°C) and the resulting mixture is then heated to a temperature of the order of about 40°C to about 130°C, preferably to a temperature of about 90°C to about 120°C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20°C to about 115°C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin laurate and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the diisocyanate and polyester diol are reacted, if desired in the presence of a catalyst as defined above, in a preliminary stage to form an isocyanate-terminated prepolymer. The proportions of diisocyanate and polyester diol employed in the preparation of this prepolymer are consistent with the ranges defined above. The diisocyanate and polyester diol are preferably rendered substantially free from the presence of extraneous moisture, using the methods described above, before the formation of the prepolymer is carried out. The formation of the prepolymer is advantageously carried out at a temperature within the range of about 70°C to about 130°C under an inert atmosphere such as nitrogen gas in accordance with conventional procedures. The prepolymer so formed can then be reacted, at any desired time, with the extender diol to form the desired elastomers of the invention. This reaction is carried out advantageously within the range of reaction temperatures specified above for the one-shot procedure. In general the prepolymer and extender are mixed and heated within the requisite temperature range while the mixture is degassed as described previously. The degassed mixture is then transferred to a suitable mold, extrusion apparatus, or the like and cured as described for the one-shot procedure.

If desired, the elastomers of the invention can have incorporated in them, at any appropriate stage of their preparation, additives such as pigments, fillers, lubricants, stabilizers, antioxidants, coloring agents, fire retardants and the like, which are commonly used in conjunction with polyurethane elastomers.

The elastomers of the invention can be used for purposes well-known in the art for polyurethane elastomers, for example, as gaskets, diaphragms, tubing, extrusions and the like. The elastomers of the invention have the advantage of possessing markedly higher resistance to exposure to high temperature as compared to closely related elastomers which differ but slightly therefrom in chemical composition. Further, this highly useful increase in resistance to exposure to high temperature has been achieved without sacrificing any of the other useful properties such as tensile strength, modulus, and the like.

The following examples describe the manner and process of making and using the invention and set forth the best mode contemplated by the inventors of carrying out the invention but are not to be construed as limiting.

EXAMPLE 1

A 100 g. batch (0.1 equivalents) of a polycaprolactone diol of molecular weight 2000 (NIAX D560: Union Carbide) was degassed by heating at 110°C under reduced pressure for 30 minutes. To the resulting material was added with stirring, 19.8 g. (0.2 equivalents) of hydroquinone bis(2-hydroxyethyl ether) and the resulting mixture was again degassed at 110°C under reduced pressure for 30 minutes. To the resulting product, still at 110°C, was added 0.039 g. of stannous octoate followed by 40.4 g. (0.306 equivalents) of 3,3'-dimethyldiphenyl-4,4'-diisocyanate. The mixture so obtained was subjected to high speed mechanical stirring for 15 seconds and then poured into a shallow aluminum tray. The poured elastomer and tray were allowed to stand at room temperature (circa 20°C) for 24 hours. Thereafter, the elastomer was chopped into pieces, granulated and dried for 3 hours at 110°C. The dried material was then injection molded to form a sheet (4.5 × 4.5 × 1/16 inch) for test purposes. The resulting sheet was post cured for 16 hours at 115°C followed by 7 days at room temperature (circa 20°C). The cured elastomer so obtained was found to have the following properties.

| Density | g./cc | 1.18 |
|---|---|---|
| Hardness | Shore A | 90 |
|  | Shore D | 44 |
| Modulus (psi) |  |  |
| 50% |  | 1110 |
| 100% |  | 1320 |
| 200% |  | 1650 |
| 300% |  | 2080 |
| Tensile strength (psi) |  | 5257 |
| Elongation at break % |  | 500 |
| Tensile set at break % |  | 30 |
| Compression set % |  | 26.6 |

EXAMPLE 2

For purposes of comparison, three elastomers which are very closely related to the elastomer of Example 1, but which do not fall within the present invention, were each prepared using an identical procedure to that described in Example 1 from the following ingredients and proportions (equivalents). [It is to be noted that the variation in proportion of polyol to extender between the various formulations was necessary in order to produce elastomers having substantially the same hardness in each case. This requirement for identical hardness is necessary in order for a real comparison of other properties to be made.]

| Elastomer | Polyester diol | Extender | Diisocyanate |
|---|---|---|---|
| 2A | Same as Ex. 1 (0.1 equiv.) | Hydroquinone bis(2-hydroxyethyl ether) (0.25 equiv.) | 4,4'-methylene-bis(phenyl isocyanate) (0.357 equiv.) |
| 2B | Same as Ex. 1 (0.1 equiv.) | 1,4-butanediol (0.3 equiv.) | Same as Example 1 (0.408 equiv.) |
| 2C | Same as Ex. 1 (0.1 equiv.) | 1,4-butanediol (0.5 equiv.) | 4,4'-methylene-bis(phenyl isocyanate) (0.612 equiv.) |

The above elastomers were prepared in sheet form by injection molding and cured as described in Example 1 before submitting to physical testing. The physical properties of these elastomers were found to be as follows:

| Elastomer | 2A | 2B | 2C |
|---|---|---|---|
| Density g./cc. | 1.19 | 1.19 | 1.20 |
| Hardness Shore A | 90 | 89 | 93 |
| Shore D | 42 | — | 47 |
| Modulus (psi) |  |  |  |
| 50% | 930 | — | 1390 |
| 100% | 1190 | 1360 | 1760 |
| 200% | — | — | — |
| 300% | 2260 | 1640 | 4290 |
| Tensile strength (psi) | 6090 | 2210 | 7080 |
| Elongation at break % | 550 | 570 | 450 |
| Tensile set at break % | 25 | 153 | 25 |
| Compression set % | 23.2 | 47.4 | 31.8 |

A direct comparison was then made of the melting characteristics and the effect of temperature on modulus for the above polymers and for that of Example 1.

The melting characteristics of the polymer in each case were determined using a differential scanning calorimeter (Perkin-Elmer model DSC-1) at a scanning rate of 20°C/minute. The effect of temperature on the torsional modulus was measured using a modified Gehman apparatus (ASTM D1053-61) in a controlled temperature bath with a rate of increase of 1°C/minute. The "heat resistance temperature" is that temperature at which the torsional modulus shows an abrupt decrease.

The results of these measurements were as follows:

| Elastomer: | Polymer Melting Characteristics | Heat Resistance Temperature |
|---|---|---|
| Example 1: | 160°C | 150°C |
| 2A | 125°C | 130°C |
| 2B | 130°C | 135°C |
| 2C | 125°C | 125°C |

Effect of temperature on torsional modulus

| | Torsional modulus psi | | | |
|---|---|---|---|---|
| Temp. °C. | Elastomer: Ex. 1 | 2A | 2B | 2C |
| 20 | 3750 |  |  |  |
| 30 | 3414 | 1822 |  | 3653 |
| 40 | 3274 | 1695 | 3589 | 3118 |
| 50 | 3106 | 1594 | 3408 | 2671 |
| 60 | 3043 | 1544 | 3230 | 2384 |
| 70 | 2921 | 1495 | 3036 | 2152 |
| 80 | 2862 | 1464 | 2914 | 2004 |
| 90 | 2862 | 1464 | 2797 | 1882 |
| 100 | 2862 | 1420 | 2686 | 1715 |
| 110 | 2862 | 1346 | 2632 | 1593 |
| 120 | 2862 | 1317 | 2528 | 1431 |
| 130 | 2862 | 1167 | 2178 | 1266 |
| 140 | 2770 | 903 | 1746 | 905 |
| 150 | 2616 | 668 | 1393 | 639 |

From the above Table it will be seen that the percentage overall loss in torsional modulus for the elastomer of Example 1 is only 5% in the range of 60° to 125°C and only 10% in the range of 125° to 150°C whereas the corresponding losses for Elastomer 2A are 20 and 50%, for Elastomer 2B are 25 and 40% and for Elastomer 2C are 50 and 50%.

It will be seen from the above results that the elastomer of Example 1 is markedly superior to the closely related elastomers 2A, 2B, 2C in that it possesses a significantly higher heat resistance temperature and it suffers markedly less loss in torsional modulus at temperatures up to 150°C.

EXAMPLE 3

Using the procedure described in Example 1, but replacing the polycaprolactone diol there used by 0.1 equivalents of Polycap 3500 (a polycaprolactone having molecular weight of 3500) and increasing the proportion of hydroquinone bis(2-hydroxyethyl ether) to 0.6 equivalents and the proportion of 3,3'-dimethyldiphenyl-4,4'-diisocyanate to 0.72 equivalents, there was obtained another elastomer of the invention having correspondingly higher heat resistance properties than those shown above for Elastomers 2A, 2B and 2C.

Similarly, using the procedure described in Example 1, but replacing the polycaprolactone there used by 0.1 equivalents of Polycap 850 (a polycaprolactone having molecular weight of 850) and decreasing the proportions of hydroquinone bis(2-hydroxyethyl ether) and 3,3'-dimethyldiphenyl-4,4'-diisocyanate to 0.1 and 0.206 equivalents, respectively, there was obtained another elastomer of the invention having correspondingly higher heat resistance properties then those shown above for Elastomers 2A, 2B, and 2C.

We claim:

1. A high temperature resistant, thermoplastic polyurethane elastomer characterized by the presence therein of each of the recurring units of the following formulae:

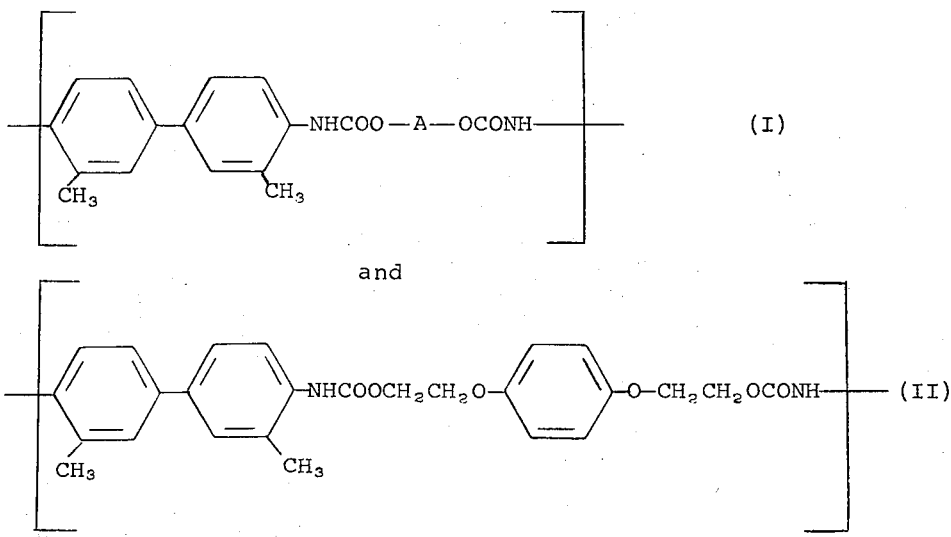

wherein A is the residue of a polyester diol HO—A—OH having a molecular weight in the range of 800 to 3500, the overall proportion of units having the formula (I) to units having the formula (II) in said polyurethane elastomer being within the range of 1:1 to 1:7.

2. A polyurethane elastomer according to claim 1 wherein the group A is the residue of a polycaprolactone diol.

3. A polyurethane elastomer according to claim 1 wherein the overall proportion of units having the formula (I) to units having the formula (II) is about 1:1.5 to 1:5.

4. A polyurethane elastomer according to claim 1 which has been prepared by a one-shot reaction between 3,3'-dimethyldiphenyl-4,4'-diisocyanate, hydroquinone bis(2-hydroxyethyl ether), and a polyester diol HO—A—OH, the proportion of equivalents of hydroquinone bis(2-hydroxyethyl ether) to polyester diol being within the range of about 1.5:1 to about 5:1 and the overall ratio of equivalents of isocyanate to combined equivalents of hydroxyl containing compounds being within the range of about 0.98:1 to about 1.10:1.

5. A polyurethane elastomer according to claim 4 wherein the polyester diol is a polycaprolactone diol have a molecular weight of about 2000.

6. A polyurethane elastomer according to claim 5 wherein the molar proportion of polycaprolactone diol to hydroquinone bis(2-hydroxyethyl ether) is approximately 1:2 and the overall ratio of equivalents of isocyanate to combined equivalents of hydroxyl containing compounds is within the range of 1.02:1 to 1.05:1.

* * * * *